Dec. 2, 1930.  E. M. HOLT  1,783,333
AUTOMATIC FEED CONTROL FOR COTTON OPENING MACHINERY
Filed July 31, 1929  2 Sheets-Sheet 1

INVENTOR.
Edwin M. Holt.
BY
Southgate Hay + Hawley
ATTORNEYS.

Dec. 2, 1930.  E. M. HOLT  1,783,333
AUTOMATIC FEED CONTROL FOR COTTON OPENING MACHINERY
Filed July 31, 1929   2 Sheets-Sheet 2

INVENTOR.
Edwin M. Holt
BY
Southgate Fargo Hawley
ATTORNEYS.

Patented Dec. 2, 1930

1,783,333

UNITED STATES PATENT OFFICE

EDWIN M. HOLT, OF WEST DURHAM, NORTH CAROLINA, ASSIGNOR TO WHITIN MACHINE WORKS, OF WHITINSVILLE, MASSACHUSETTS, A CORPORATION OF MASSACHUSETTS

AUTOMATIC FEED CONTROL FOR COTTON-OPENING MACHINERY

Application filed July 31, 1929. Serial No. 382,424.

This invention relates to an automatic feed control for cotton opening machinery and more particularly to a control mechanism regulating the flow of cotton to a plurality of feeders for picker machines.

It is customary to operate a plurality of picker machines in connection with a single bale breaker or cotton opening machine. It is of great importance for each picker machine to receive an adequate supply of cotton at all times, since a deficiency of cotton in the feeder of the machine results in the production of laps of uneven and irregular weight.

On the other hand, an excess feed of cotton from the opening machinery causes the cotton to overflow from the feeders and to accumulate on the floor of the picker room, which is wasteful of stock and labor and also introduces a serious fire hazard.

It is the general object of my present invention to provide improved control mechanism by which an adequate supply of cotton will be provided for each of a plurality of feeders for picker machines, and by which the operation of the opening machinery will be interrupted whenever the hoppers of all of the feeders are completely filled.

A further object of my invention is to provide automatic mechanism for the above defined purpose, which mechanism acts directly on the opening machinery and does not require the installation of a separate and expensive feed control machine.

The present invention provides an efficient automatic control of the feed of cotton in direct proportion to the demand for the same and is economical to manufacture, convenient of installation, flexible to suit operating conditions, and very reliable in operation.

My invention further relates to arrangements and combinations of parts which will be hereinafter described and more particularly pointed out in the appended claims.

A preferred form of the invention is shown in the drawings in which

Figure 1:
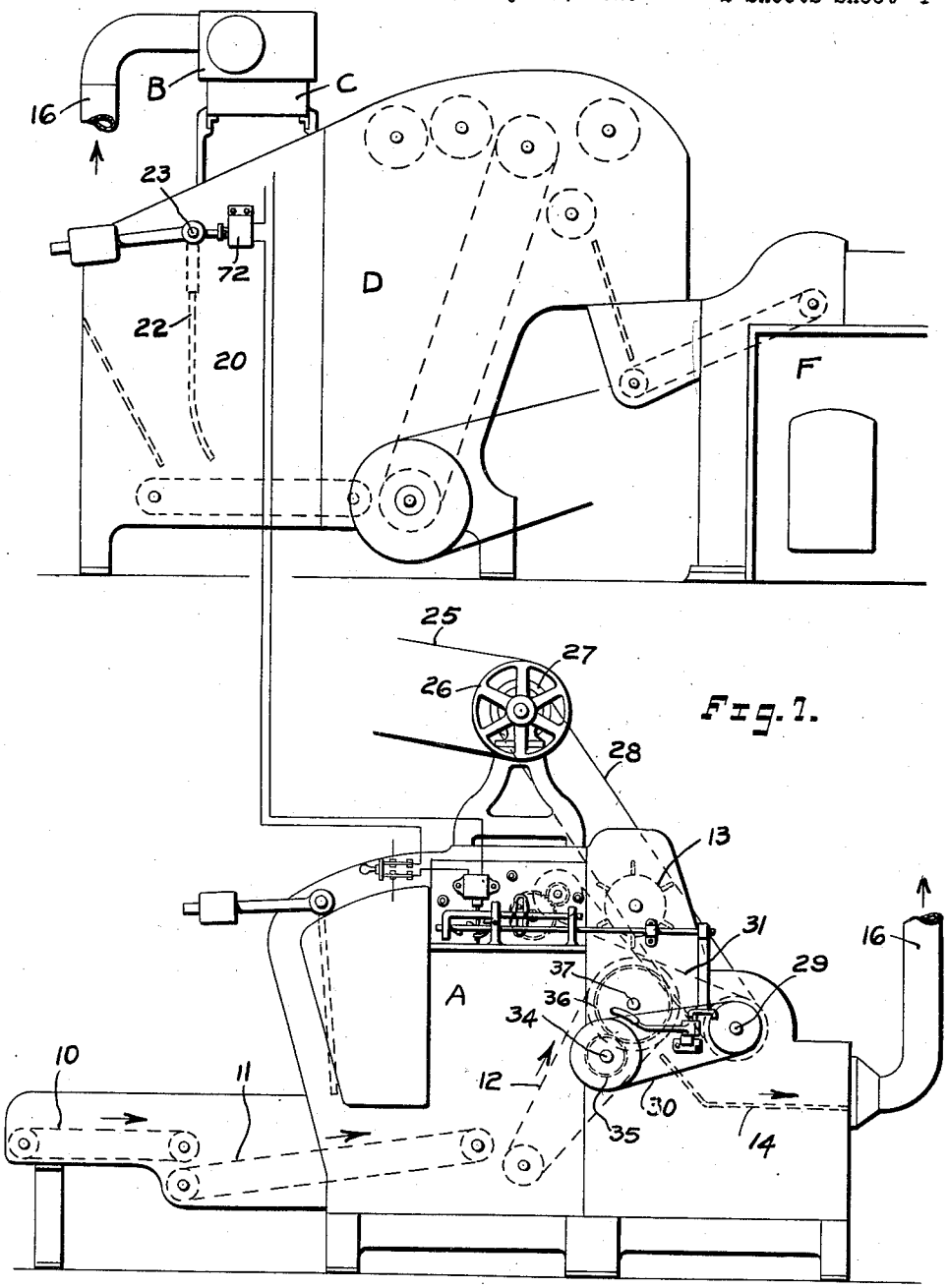
Fig. 1 is a diagrammatic side elevation of a cotton opening machine and a feeder for a picker machine.

Referring to Fig. 1, I have shown a cotton opening machine or bale breaker A, a condenser B, a distributing mechanism C and one of a series of feeders D by which the cotton is fed to breaker-lappers or other picker machines F. Each of these machines is in general of the usual commercial form and in itself constitutes no part of my invention.

The cotton as it is taken from the bales is placed on a conveyor 10 in the opening machine A and is advanced by a second conveyor 11 to a feeding conveyor 12 by which it is carried upward into contact with the beater roll 13. The cotton then falls onto a shelf or platform 14 from which it may be conveyed by air suction through a pipe 16 to the condenser B and distributor C.

The distributor C commonly extends transversely over the hoppers 20 of a series of feeders D, arranged side by side, and a single opening machine commonly supplying four or five such feeders D and corresponding picker machines F.

A feed opening is provided from the distributor C to each hopper 20 and a door or closure therefor (not shown) is also provided, said door being connected to a swinging plate 22 pivotally mounted at 23 and positioned to be moved to the left in Fig. 1 when the hopper 20 is filled with cotton. Such movement to the left causes the corresponding door in the distributor C to be closed and prevents the delivery of further cotton to that particular feeder D.

In carrying out my invention, I provide means which will now be described for interrupting the operation of the feeding conveyor 12 in the bale breaker or opening machine A whenever all of the outlets from the distributor C have been closed by the operation of the swinging plates 22 in all of the series of feeders D.

Referring to Fig. 1, the opening machine A is shown as provided with a driving belt 25 running on a pulley 26 and rotating an associated pulley 27 which drives a belt 28 and causes the same to rotate a shaft 29 from which belts 30 and 31 are continuously driven. The belt 30 runs on fast and loose pulleys 32 and 33 on a shaft 34 which is connected by gears 35 and 36 to a shaft 37 on which is mounted the upper or driving drum for the feeding conveyor 12.

The belt 31, previously mentioned, acts through gears 40 and 41 to continuously rotate a crank pin 42. The crank pin 42 is positioned in an elongated slotted member 44, secured to an actuating rod 45 mounted to slide in openings in bearing supports 46 and 47. The opening in the support 46 is vertically elongated so that a limited upward movement of the bar 45 is permitted.

Figure 3:
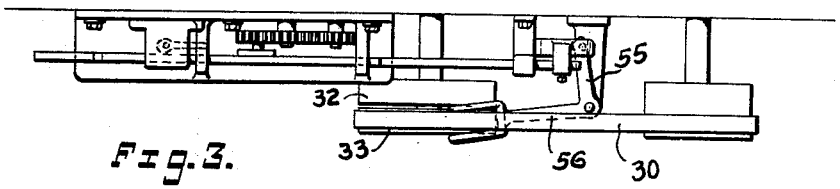
Fig. 3 is a plan view thereof.

A second bar 50 is also slidable in openings in the supports 46 and 47 and is provided with a forked arm 52 having a lost motion connection with a pin 54 on an arm 55 forming part of a shipper lever 56. When the bar 50 is moved to the left to the position shown in Figs. 2 and 3, the shipper lever is operated to move the belt 31 from the tight pulley 32 to the loose pulley 33.

The bar 50 extends through an opening in an offset portion 60 of the bar 45, and is provided with a lug or projection 61 on its lower side and a corresponding lug or projection 62 on its upper side. A cam 64 is mounted in the support 46 below the bar 45. When the cam is in the normal or running position shown in Fig. 1, the bar 45 will be in its lowered position, in which it will engage the upper projection 62 on the bar 50 and will move said bar to the right from the position shown in Fig. 2 to the position shown in Fig. 1, thus throwing the belt 30 to the tight pulley 32.

Figure 2:
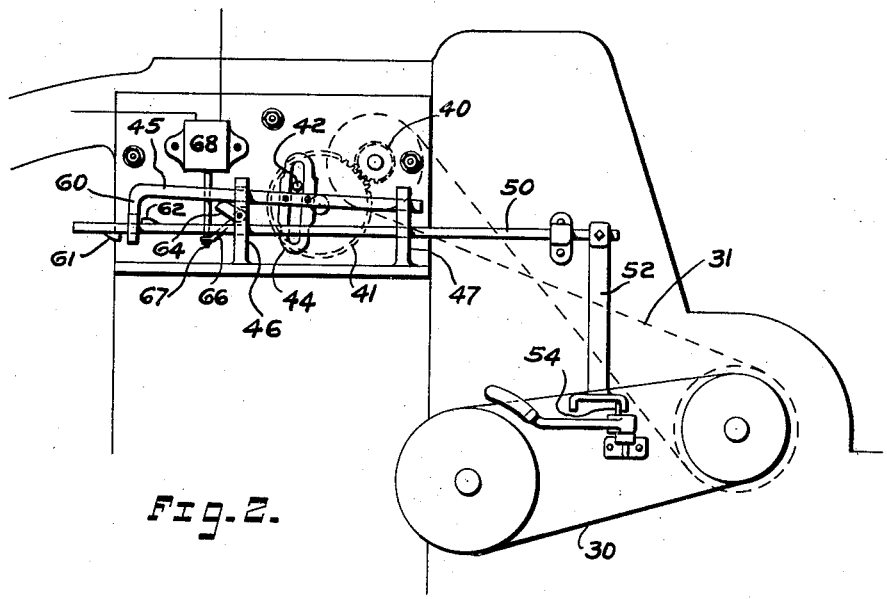
Fig. 2 is an enlarged side elevation of certain parts shown in Fig. 1.

When the cam 64 is swung upward to the position shown in Fig. 2, the bar 45 is raised and engages the projection 61 on the under side of the bar 50, moving the bar 50 to the left from the position shown in Fig. 1 to the idle position shown in Fig. 2 and causing the belt 30 to be shifted to the loose pulley 33.

Figure 4:
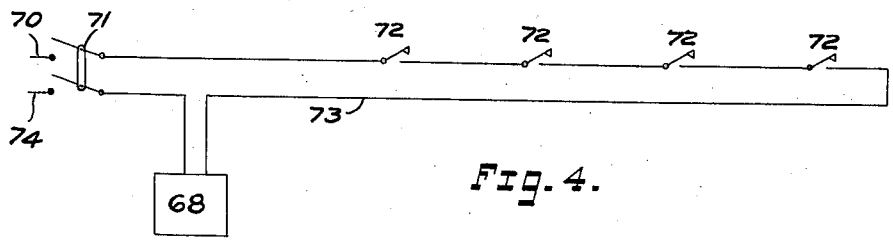
Fig. 4 is a diagrammatic view of certain electrical connections.

The cam 64 is provided with an arm 66 connected to a rod or plunger 67 which is adapted to be moved upward by a magnet 68. The power circuit for the magnet 68 is indicated in Fig. 4, the current being taken from a line wire 70 through a double hand switch 71 and also through a series of single switches 72, one for each picker machine or breaker-lapper. The current then flows through the wire 73 to the magnet 68 and completes the circuit through the line wire 74.

It will be seen that the magnet 68 will be energized only when the hand switch 71 and all of the single switches 72 are closed. One of the switches 72 is indicated in Fig. 1 and is adapted to be closed when the stop motion plate 22 swings to the left, which movement occurs when the hopper of the feeder D is filled with cotton. At the same time, as previously described, a door or shutter is moved to cut off the delivery of cotton from the distributor C of this particular feeder D.

Having described the details of construction of my improved feed control, the method of operation will be readily apparent.

After one of the feeders D is fully supplied with cotton, its plate 22 will swing rearward, or to the left in Fig. 1, cutting off access to the distributor C and at the same time closing the single switch 72. The opening machinery or bale breaker will remain in operation to supply cotton to the other feeders D and picker machines F.

If the supply of cotton continues excessive, the remaining feeders D will be successively filled, and as each feeder is filled its corresponding switch 72 will be closed. When all the feeders are fully supplied with cotton and are shut off from the distributor C, all of the switches 72 will have been closed and the magnet 68 will be energized to raise the plunger 67, swinging the cam 64 to the position shown in Fig. 2 and causing the belt 30 to be moved to the loose pulley 33, thus stopping the operation of the feeding conveyor 12 in the opening machine.

No further feed will take place until one or more of the feeders D are emptied to such an extent that their switches 72 may be opened. As soon as any one of the switches 72 is opened, the magnet 68 will allow the plunger 67 to move the cam 64 to the position shown in Fig. 1. Thereupon the belt 30 will be shifted to the tight pulley 32 and the feeding conveyor 12 will resume operations.

I have thus provided a very simple and effective construction by which the feed of cotton is interrupted whenever all the hoppers are filled with cotton and in which the feeding operation is resumed as soon as the cotton is withdrawn to any substantial extent from any one of the feeders.

The invention is easily installed and is effective and reliable in operation. The electric control is particularly desirable in this type of machinery as the feeders D and picker machines F may be in a part of the mill very substantially removed from the room where the opening machinery A is operating.

While I have described the part 68 as a magnet, it will be understood that a solenoid may be substituted therefor and is the obvious equivalent thereof.

Having described my invention and the advantages thereof, I do not wish to be limited to the details herein disclosed, otherwise than as set forth in the claims, but what I claim is:—

1. A cotton opening machine comprising a feeding conveyor, a belt drive therefor including tight and loose pulleys, a belt shipper to move the belt from one pulley to the other, a sliding bar connected to said belt shipper, a second sliding bar, means to continuously reciprocate said second bar, a plurality of cotton feeders, and means controlled by the joint action of all of said feeders effective to connect said bars to each other, whereby said first bar is actuated to stop the feed in the opening machine.

2. A cotton opening machine comprising a feeding conveyor, a belt drive therefor including tight and loose pulleys, a belt shipper to move the belt from one pulley to the other, a sliding bar connected to said belt shipper, a second sliding bar, means to continuously reciprocate said second bar, a cam to raise and lower said second bar, said first bar having a projection engaged by said second bar when the latter is in raised position and having a second projection engaged by the second bar when said bar is in lowered position, whereby said first bar is moved to shift the belt, and control means for said cam.

3. A cotton opening machine comprising a feeding conveyor, a belt drive therefor including tight and loose pulleys, a belt shipper to move the belt from one pulley to the other, a sliding bar connected to said belt shipper, a second sliding bar, means to continuously reciprocate said second bar, a cam to raise and lower said second bar, said first bar having a projection engaged by said second bar when the latter is in raised position and having a second projection engaged by the second bar when in lowered position, whereby said first bar is moved to shift the belt, and means to actuate said cam, said means being jointly controlled by a plurality of cotton feeders.

4. A cotton opening machine comprising a feeding conveyor, a belt drive therefor including tight and loose pulleys, a belt shipper to move the belt from one pulley to the other, a sliding bar connected to said belt shipper, a second sliding bar, means to continuously reciprocate said second bar, a cam to raise and lower said second bar, said first bar having a projection engaged by said second bar when the latter is in raised position and having a second projection engaged by said second bar when in lowered position, a magnet to move said cam, a circuit therefor, a plurality of cotton feeders, and a plurality of switches in series in said circuit, each switch being controlled by the amount of cotton accumulated in one of said cotton feeders.

5. A cotton opening machine, a plurality of cotton feeders, a device effective to render said opening machine operative and inoperative, and control means for said device, said control means being itself rendered operative by the joint action of all of said feeders, and including a belt drive having tight and loose pulleys and connected to said device, a belt shipper mounted to move said belt from one pulley to the other, a sliding bar connected to said belt shipper, a second sliding bar, means to continuously reciprocate said second bar, and means effective to connect said bars to each other upon the joint action of all of the feeders, whereby said first bar is agitated to stop the feed in the opening machine.

6. A cotton opening machine, a plurality of cotton feeders, a device effective to render said opening machine operative and inoperative, and control means for said device, said control means being rendered operative by the joint action of all of said feeders and being rendered inoperative by the separate action of any one of said feeders, and including a belt drive having tight and loose pulleys and connected to said device, a belt shipper to move the belt from one pulley to the other, a sliding bar connected to said belt shipper, a second sliding bar, means to continuously reciprocate said second bar, a cam to raise and lower said second bar, said first bar having a projection engaged by said second bar when the latter is in raised position, and having a second projection engaged by said second bar when in lowered position, electrically controlled means to actuate said cam having a plurality of switches in series with said means, each switch being controlled by the amount of cotton accumulated in one of said cotton feeders.

7. A cotton opening machine, a plurality of cotton feeders, a device effective to render said opening machine operative and inoperative, and control means for said device, said control means being rendered operative by the joint action of all of said feeders and being rendered inoperative by the separate action of any one of said feeders, said control means comprising a magnet, a power circuit therefor, and a separate switch in said circuit for and controlled by each separate cotton feeder and adapted to be closed when said feeder is fully supplied with cotton, a belt drive having tight and loose pulleys, a belt shipper to move the belt from one pulley to the other, a sliding bar connected to said belt shipper, a second sliding bar, means to continuously reciprocate said second bar, a cam to raise and lower said second bar, said first bar having a projection engaged by said second bar when the latter is in raised position and having a second projection engaged by said second bar when in lowered position said magnet being operatively connected to actuate said cam.

In testimony whereof I have hereunto affixed my signature.

EDWIN M. HOLT.